US012288952B2

(12) United States Patent
Kulas et al.

(10) Patent No.: US 12,288,952 B2
(45) Date of Patent: Apr. 29, 2025

(54) CONDUCTOR CONNECTION TERMINAL

(71) Applicant: WAGO Verwaltungsgesellschaft mbH, Minden (DE)

(72) Inventors: Sascha Kulas, Hannover (DE); Niko Rethemeier, Huellhorst (DE)

(73) Assignee: Wago Verwaltungsgesellschaft MBH, Minden (DE)

(*) Notice: Subject to any disclaimer, the term of this patent is extended or adjusted under 35 U.S.C. 154(b) by 252 days.

(21) Appl. No.: 17/984,027

(22) Filed: Nov. 9, 2022

(65) Prior Publication Data

US 2023/0155306 A1 May 18, 2023

(30) Foreign Application Priority Data

Nov. 12, 2021 (DE) .................... 10 2021 129 577.7

(51) Int. Cl.
*H01R 4/2433* (2018.01)

(52) U.S. Cl.
CPC .................................. *H01R 4/2433* (2013.01)

(58) Field of Classification Search
CPC .............. H01R 4/2433; H01R 13/5221; H01R 4/4821; H01R 4/483
See application file for complete search history.

(56) References Cited

U.S. PATENT DOCUMENTS 5,704,801 A * 1/1998 Walker .................. H01R 12/675 439/417
6,238,233 B1 * 5/2001 Drexler ................ H01R 4/2412 439/459
8,328,586 B2 * 12/2012 Bies ...................... H01R 4/483 439/725
2016/0028291 A1 * 1/2016 Tsukanaka ............... H01H 5/02 290/1 E

FOREIGN PATENT DOCUMENTS

| | | | |
|---|---|---|---|
| AU | 609599 | | 10/1989 |
| CH | 654696 | A5 | 2/1986 |
| DE | 2017987 | B1 | 7/1971 |
| DE | 2449326 | A1 | 4/1976 |
| DE | 10 2015 114 134 | A1 | 3/2017 |
| EP | 0 338 952 | A1 | 10/1989 |
| JP | H 11-54163 | A | 2/1999 |
| WO | WO9833235 | A1 | 7/1998 |

* cited by examiner

*Primary Examiner* — Tulsidas C Patel
*Assistant Examiner* — Carlos E Lopez-Pagan
(74) *Attorney, Agent, or Firm* — Muncy, Geissler, Olds & Lowe, P.C.

(57) ABSTRACT

A conductor connection terminal for connecting an electrical conductor by means of an insulation displacement connection, wherein the conductor connection terminal has at least one insulation displacement connection, a pressure piece that can be pressurized by means of a manually generated actuating force, a stamp acting on the electrical conductor and a compression spring arranged between the pressure piece and the stamp, wherein the insulation displacement connection has an insulation displacement contact with two contact edges arranged next to each other, wherein between opposite sides of the contact edges a cutting slot is formed, wherein the force of the compression spring is effective in the longitudinal direction of the cutting slot.

11 Claims, 4 Drawing Sheets

CONDUCTOR CONNECTION TERMINAL

This nonprovisional application claims priority under 35 U.S.C. § 119(a) to German Patent Application No. 10 2021 129 577.7, which was filed in Germany on Nov. 12, 2021, and which is herein incorporated by reference.

BACKGROUND OF THE INVENTION

Field of the Invention

The present invention relates to a conductor connection terminal for connecting an electrical conductor by means of an insulation displacement connection (IDC).

Description of the Background Art

A conductor connection terminal is known, for example, from WO 98/33235, which corresponds to U.S. Pat. No. 6,238,233.

SUMMARY OF THE INVENTION

It is therefore an object of the present invention to provide an improved conductor connection terminal, which is also suitable for the transmission of high currents.

This object is achieved in an exemplary embodiment by a conductor connection terminal for connecting an electrical conductor via an insulation displacement connection, wherein the conductor connection terminal comprises at least one insulation displacement connection, one pressure piece that can be pressurized by means of an, for example, manually generated actuating force, a stamp acting on the electrical conductor and a force accumulator, which is effective between the pressure piece and the stamp, wherein the insulation displacement connection has an insulation displacement contact with two contact edges arranged next to each other, wherein a cutting slot is formed between opposite sides of the contact edges, wherein the force of the force accumulator is effective in the longitudinal direction of the cutting slot. The conductor connection terminal according to the invention allows for easy handling for the user when connecting an electrical conductor, since the electrical conductor does not have to be stripped first. This is particularly advantageous for large conductor cross-sections, as in this case stripping is associated with increased workload. The conductor connection terminal may be set up in particular for connecting an electrical conductor with a cross-sectional area of at least 70 $mm^2$.

By means of the force accumulator, a permanent compressive force can be exerted on an electrical conductor clamped between the contact edges, so that a long-term stable connection of the electrical conductor with the insulation displacement contact can be ensured.

The force accumulator is effective between the pressure piece and the stamp with regard to the absorption and delivery of the force stored in it. For example, the force accumulator may be partially or completely arranged between the pressure piece and the stamp. The force accumulator may be embodied, for example, as a compression spring, tension spring or elastic block of material, optionally in combination with a force deflection mechanism. The force accumulator can be designed, for example, as a spiral spring or as a disk spring.

With such an insulation displacement contact, the electrical conductor, which is still equipped with the insulation, is simply pressed against the contact edges on one side and pressed into the cutting slot from here. The contact edges cut the insulation of the electrical conductor so that the contact edges come into electrical contact with the electrically conductive inner material of the electrical conductor, for example with stranded wires or a single-wire conductor. The cutting slot, viewed in the direction of conductor insertion, for example, can be U-shaped or V-shaped.

the conductor connection terminal can have a manual actuating element which is coupled with the pressure piece or is part of the pressure piece, wherein the manually generated actuating force is transferable to the pressure piece by the manual actuating element. In this way, the conductor connection terminal has its own actuating element, so that there is no need to use an external tool or other object for manual actuation. The manual actuating element may be designed, for example, as a pivoting actuating lever or as an actuating pusher. Especially in the case of large conductor cross-sections, the formation of the actuating element as a pivotable actuating lever is advantageous, since with such an actuating lever, larger conductor contact forces can be transmitted to the electrical conductor.

The conductor connection terminal can have a resetting lock by which the actuating element is secured in an actuated end position against a restoring force of the force accumulator. The actuating element can thus be secured or held by the resetting lock in the state in which the stamp is attached to the electrical conductor and pushes it into the cutting slot due to the force of the force accumulator. The resetting lock can be designed differently, for example as a locking of the actuating element. In the case of a pivoting actuating lever, the resetting lock may also have an over-center locking position of an actuation contour of the actuating lever, for example an eccentric actuation contour.

The actuating lever can have an eccentric actuation contour and is coupled to the pressure piece via this eccentric actuation contour. With a simple and reliable mechanical design, this allows for the transmission of large forces from a manual actuating range of the actuating lever to the pressure piece.

The stamp can have a conductor guide contour that supports the guidance of the electrical conductor from a conductor insertion opening of the conductor connection terminal in the direction of the cutting slot. In this way, the stamp has an additional function, namely the guidance of the electrical conductor towards the clamping point. The conductor guide contour can be formed, for example, as a longitudinal groove in the stamp running in the direction of conductor insertion of the electrical conductor.

The conductor connection terminal can have a housing with a conductor insertion opening for the insertion of the electrical conductor to the insulation displacement contact, wherein a conductor insertion direction of the electrical conductor is specified by the conductor insertion opening, which runs perpendicular to a plane running through the two adjacent contact edges. This ensures simple, intuitive operation of the conductor connection terminal. The electrical conductor must simply be plugged into the housing of the conductor connection terminal in the conductor insertion direction through the conductor insertion opening. In the housing of the conductor connection terminal there may be an end stop that limits the maximum conductor insertion depth. If the user senses that the end stop has been reached, the electrical conductor only has to be pressed into the cutting slot by actuating the manual actuator, so that it is mechanically fixed there by means of the insulation displacement functionality and is also electrically contacted.

An electrical conductor clamped at the insulation displacement contact between the two contact edges arranged next to each other may be permanently loaded with the force of the force accumulator. This ensures a long-term stable and secure electrical connection of the electrical conductor with the insulation displacement contact.

The conductor connection terminal may have a housing, in particular a housing made of insulating material. The insulation displacement connection can, for example, be arranged fixed to the housing, i.e., essentially immovable to the housing of the conductor connection terminal. The insulation displacement connection can form a counter bearing for the stamp.

For the purposes of the present invention, the undefined term "a" is not to be understood as a number word. If, for example, there is talk of a component, this is to be interpreted in the sense of "at least one component". As far as angles are given in degrees, these refer to a circle dimension of 360 degrees (360°).

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
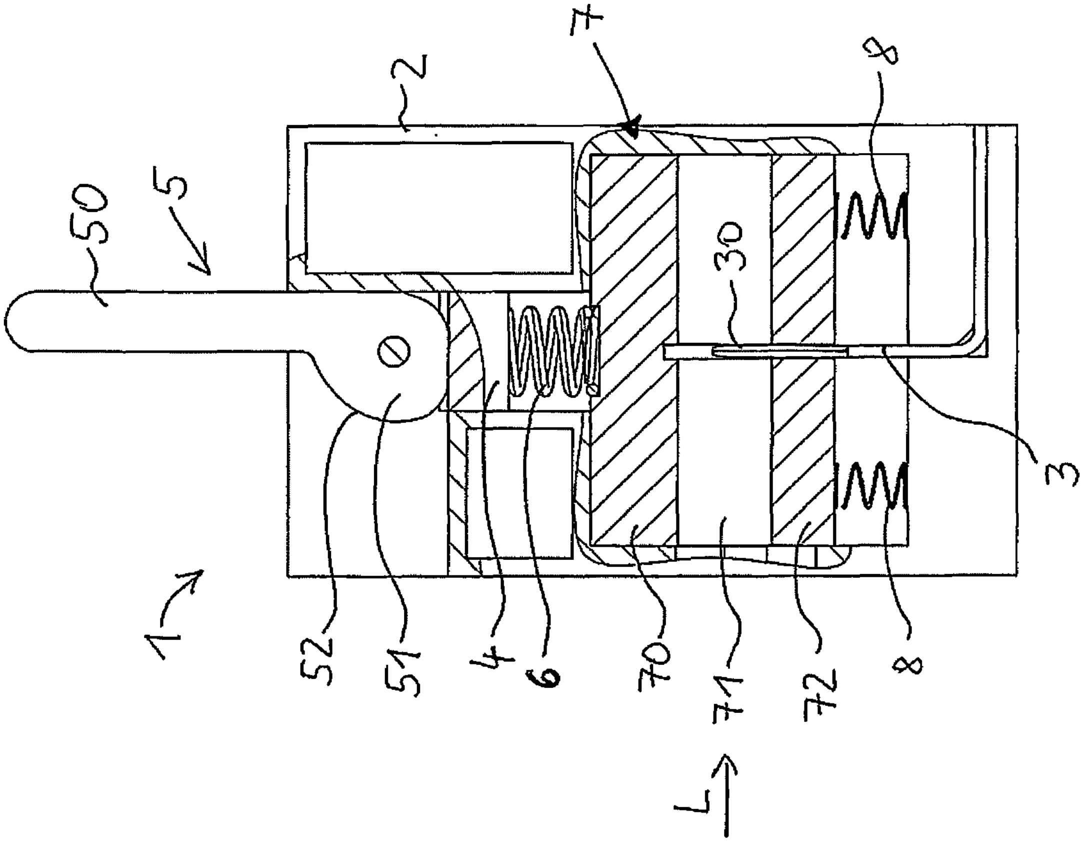
FIG. 1 shows a conductor connection terminal in an example in a partially cut side view.

The conductor connection terminal 1 seen in FIG. 1 has a housing 2, in which an insulation displacement connection 3 is arranged and is essentially fixed to the housing. The insulation displacement connection 3 has contact edges 30 that form a cutting slot 31 therebetween, to which an electrical conductor can be connected using insulation displacement technology. The electrical conductor can be inserted into the housing 2 in a conductor insertion direction L. For connecting the electrical conductor to the insulation displacement connection 3, the conductor connection terminal 1 has an actuation mechanism having a manual actuating element 5, a pressure piece 4, a force accumulator 6 and a stamp 7.

The manual actuating element 5 has a handle section 50, by which the manual actuating element 5 can be grasped and moved by the user, i.e., it can be pivoted from the open position shown in FIG. 1 to a closed position explained below. The handle section 50 is connected to a pressure section 51 of the actuating element 5 which is rotatable about a rotary axis. The pressure section 51 has an eccentric actuation contour 52, via which an actuating force can be transmitted to the pressure piece 4 when pivoting the actuating element 5 into the closed position. In this way, an actuating force manually generated on the actuating element 5 can be transmitted to the pressure piece 4. The pressure piece 4 is coupled to the stamp 7 via the force accumulator 6. The actuating force transferred to the pressure piece 4 is transferred to the stamp 7 via the force accumulator 6. The stamp 7 is movably mounted in the housing 2 and is supported by one or more support springs 8 on the housing 2 or on a connected component. Via the support springs 8, the stamp 7 is force-loaded in the direction of the pressure piece 4. The actuating force in this embodiment is preferably aligned essentially perpendicular to the conductor insertion direction L.

In the example shown in FIG. 1, the stamp 7 has an force absorption side 70, via which the force transmitted by the force accumulator 6 is absorbed at the stamp 7. On the side assigned to the support springs 8, the stamp 7 has a support side 72, via which the stamp 7 is supported on the support springs 8. Between the force absorption side 70 and the support side 72, a conductor receiving channel 71 is formed into which the electrical conductor to be connected can be inserted.

Figure 2:
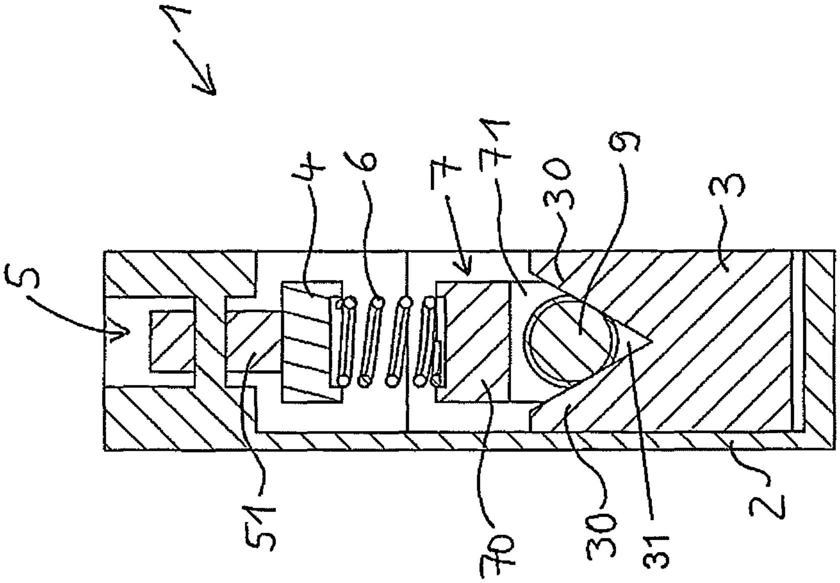
FIG. 2 shows the conductor connection terminal according to FIG. 1 in a cross-sectional view.

FIG. 2 shows the conductor connection terminal according to FIG. 1 in a different cross-sectional view with the actuated actuating element 5, i.e., the actuating element 5 is in the closed position. In this closed position, the pressure piece 4, the force accumulator 6 and the stamp 7 are shifted downwards via the pressure section 51, counter to the force effect of the support springs 8. By means of the stamp 7, the inserted electrical conductor can then be pressed with a compressive force against the contact edges 30 of the insulation displacement connection 3, so that an electrically conductive connection between the electrical conductor 9 and the insulation displacement connection 3 is established. If, for example, the electrical conductor provided with insulation is compressed or pushed against the cutting sedges 30 of the insulation displacement connection, the contact edges penetrate the insulation of the electrical conductor 9 and contact the stranded wires or a single-wire conductor of the electrical conductor.

Figure 3:
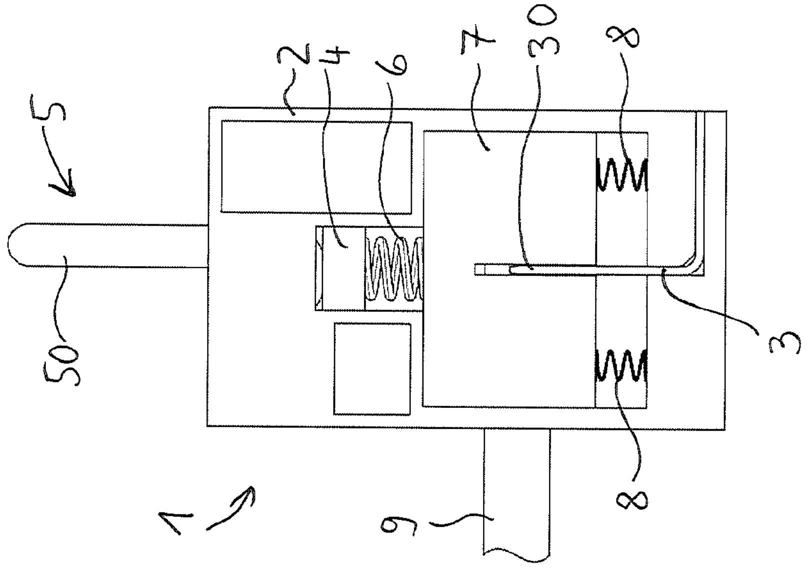
FIG. 3 shows the conductor connection terminal according to FIG. 1 in the open position of the actuating element.

The support springs 8 further cause a return of the stamp 7 to the starting position according to FIG. 1 and/or FIG. 3 when the actuating element 5 moves from the closed position to the open position. Thus, the electrical conductor 9 is also moved via the conductor receiving channel 71 from the contact edges 30 and can be removed from the conductor connection terminal 1.

FIGS. 3 and 4 again illustrate the different positions of the individual components in the open position (FIG. 3) and in the closed position (FIG. 4).

Figure 5:
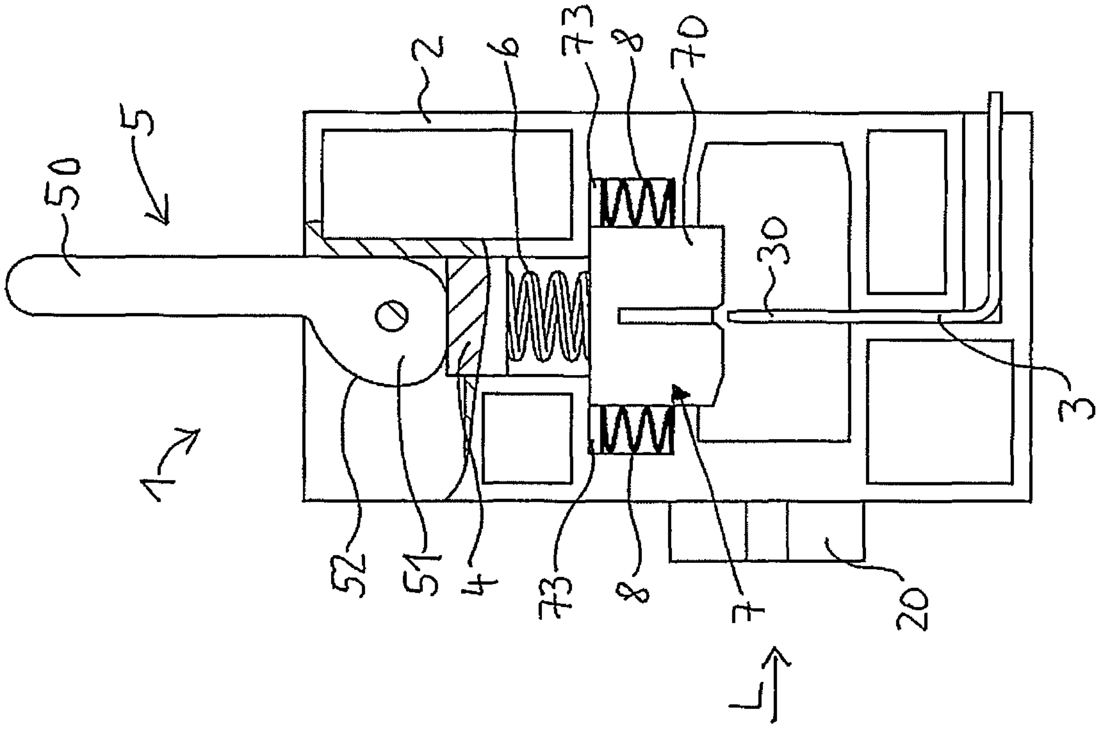
FIG. 5 shows a conductor connection terminal in an example in a partially cut side view.

FIG. 5 shows an example of a conductor connection terminal 1, which corresponds to the embodiment of FIG. 1 except for the differences explained below. In contrast to FIG. 1, the stamp 7 is designed differently, wherein the support springs 8 are also arranged in a different position. In the embodiment shown in FIG. 5, the stamp 7 on the force absorption side 70 has a radially protruding collar 73, via which the stamp 7 is mounted on the support springs 8. The support springs 8 can be supported, for example, in an area of the housing 2. In this embodiment, the stamp 7 does not have support side 72 spaced apart from the force absorption side 70 by the conductor receiving channel 71. It is conceivable that also in this embodiment the stamp may be formed with a conductor receiving channel similar to the conductor receiving channel 71 of FIG. 1.

Figure 6:
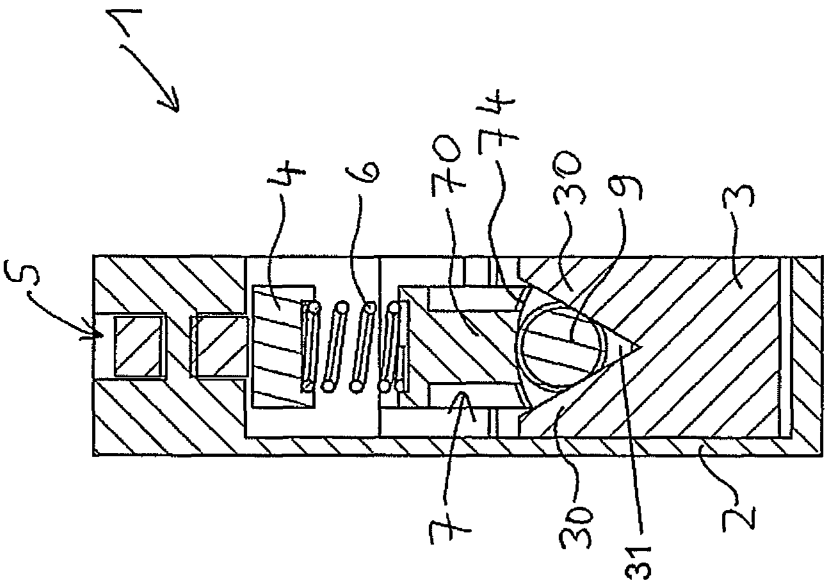
FIG. 6 shows the conductor connection terminal according to FIG. 5 in a cross-sectional view.

FIG. 5 shows the conductor connection terminal, as in FIG. 1, in the open position. FIG. 6 shows a sectional view comparable to FIG. 2 in the closed position of the conductor connection terminal 1. One can see in FIG. 6 that the stamp 7, in the area lying on the electrical conductor 9, has a further difference to the embodiment of FIGS. 1 to 4, namely a conductor guide contour 74 existing on the stamp 7, which extends like a groove or channel in the longitudinal direction or in the conductor insertion direction L of the electrical conductor 9 and thereby contributes in an improved way to a centered contacting of the contact edges 30. Furthermore, contours, for example protruding edges or projections aligned transversely to the conductor insertion direction L, can be provided on the conductor guide contour 74. In the closed position, these contours press into the insulation of the electrical conductor 9, so that the conductor retention forces can be advantageously increased. It is of course possible to provide such a conductor guide contour 74 also in the stamp according to the first embodiment of the conductor connection terminal.

Figure 4:
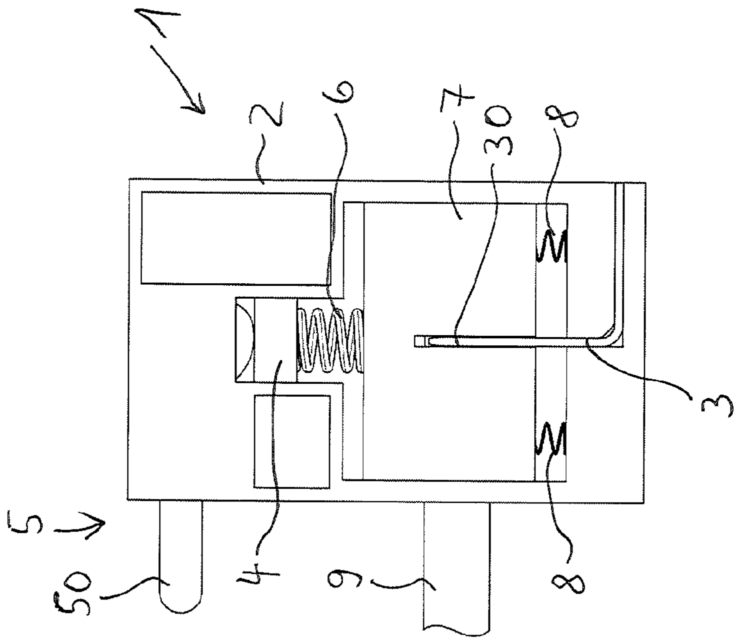
FIG. 4 shows the conductor connection terminal according to FIG. 1 in the closed position of the actuating element.
Figure 8:
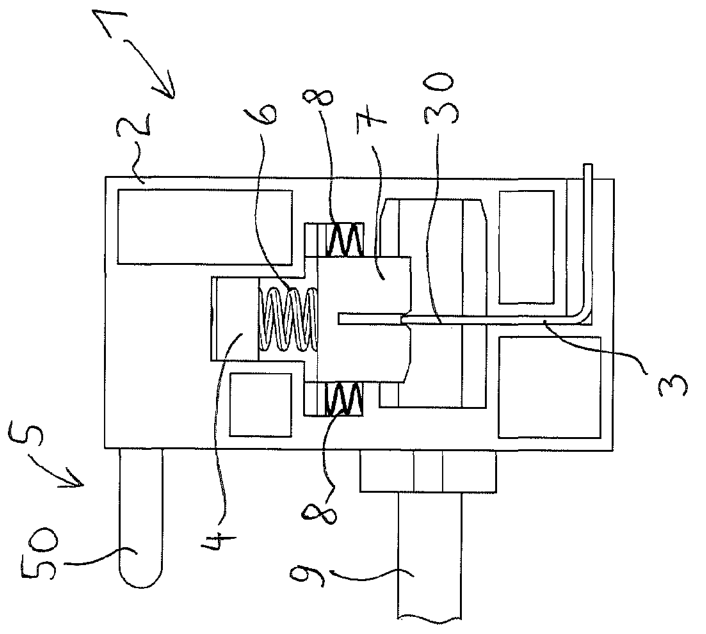
FIG. 8 shows the conductor connection terminal according to FIG. 5 in the closed position of the actuating element.
Figure 7:
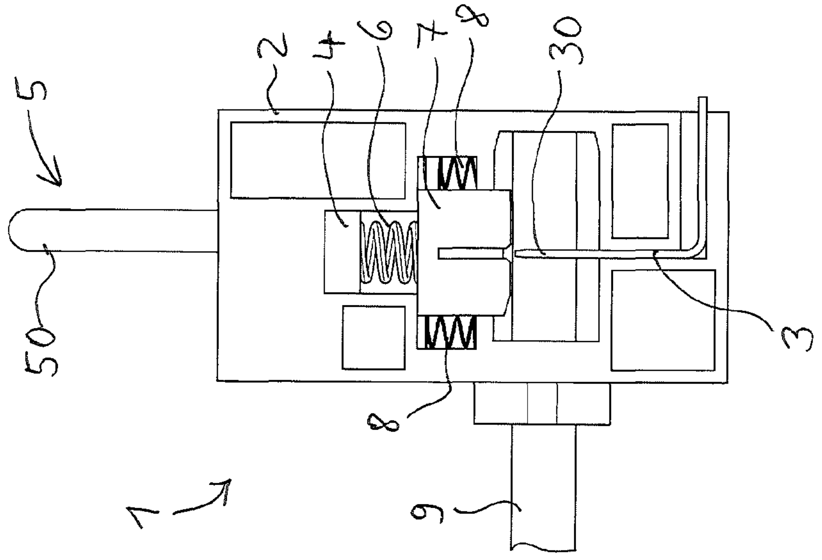
FIG. 7 shows the conductor connection terminal according to FIG. 5 in the open position of the actuating element.

FIGS. 7 and 8 show, analogous to FIGS. 3 and 4, the conductor connection terminal 1 in the open position (FIG. 7) and in the closed position (FIG. 8).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A conductor connection terminal to connect an electrical conductor via an insulation displacement connection, the conductor connection terminal comprising:

a housing:

at least one insulation displacement connection;

a pressure piece adapted to be pressed via an actuating force;

a stamp acting on the electrical conductor; and a force accumulator that is coupled between the pressure piece and the stamp, wherein the at least one insulation displacement connection has two contact edges arranged next to each other so as to oppose each other, the two contact edges being provided to cut an insulation of the electrical conductor, such that a spacing between the two contact edges forms a cutting slot, wherein the electrical conductor is positioned between the two contact edges so as to be in contact with the two contact edges, such that the electrical conductor is positioned inside the cutting slot, wherein a force of the force accumulator is directed towards the cutting slot, and wherein the insulation displacement connection is mounted in a fixed position inside the housing and the stamp is displaceably mounted inside the housing.

2. The conductor connection terminal according to claim 1, wherein the conductor connection terminal has a manual actuating element which is coupled with the pressure piece or part of the pressure piece, and wherein a manual actuation of the manual actuating element generates the actuating force that is transmitted to the pressure piece to press the pressure piece.

3. The conductor connection terminal according to claim 1, wherein the stamp has a conductor guide contour which supports the positioning of the electrical conductor between the two contact edges.

4. The conductor connection terminal according to claim 1, wherein the conductor connection terminal has a conductor receiving channel for the insertion of the electrical conductor towards the insulation displacement connection, wherein a conductor insertion direction of the electrical conductor in the conductor receiving channel runs substantially perpendicular to a plane running through the two contact edges arranged next to each other.

5. The conductor connection terminal according to claim 1, wherein the electrical conductor is clamped between the two contact edges with the force of the force accumulator.

6. The conductor connection terminal according to claim 1, wherein the stamp has a force absorption side, a support side and a conductor receiving channel formed between the force absorption side and the support side, wherein a bottom surface of the support side is contacted by support springs and an upper surface of the support side forms a first surface of the conductor receiving channel, wherein an upper surface of the force absorption side faces the force accumulator and a bottom surface of the force absorption side forms a second surface of the conductor receiving channel, and wherein the insulation displacement connection is inserted through the support side of the stamp, such that the insulation displacement connection extends through both the bottom surface and the upper surface of the support side of the stamp, so that the two contact edges extend into the conductor receiving channel.

7. The conductor connection terminal according to claim 1, wherein the insulation displacement connection is mounted in the fixed position inside the housing, such that the insulation displacement connection is immovable with respect to the housing.

8. The conductor connection terminal according to claim 2, wherein the manual actuating element is a pivoting actuating lever.

9. The conductor connection terminal according to claim 2, wherein the conductor connection terminal has a resetting lock by which the manual actuating element is secured in an actuated open position against a restoring force of the force accumulator.

10. The conductor connection terminal according to claim 8, wherein the actuating lever has an eccentric actuation contour and is coupled to the pressure piece via the eccentric actuation contour.

11. The conductor connection terminal according to claim 6, wherein one end of the force accumulator directly contacts the stamp.

* * * * *